United States Patent
Hamano et al.

(10) Patent No.: US 8,985,926 B2
(45) Date of Patent: Mar. 24, 2015

(54) TAPPING SCREW

(75) Inventors: Sinnichi Hamano, Kyoto (JP); Naoki Nishimura, Kyoto (JP); Kinya Kowada, Kyoto (JP); Kazuhiro Ueba, Kyoto (JP)

(73) Assignee: Nitto Seiko Co., Ltd., Kyoto (JP)

( * ) Notice: Subject to any disclaimer, the term of this patent is extended or adjusted under 35 U.S.C. 154(b) by 0 days.

(21) Appl. No.: 14/118,553

(22) PCT Filed: May 20, 2011

(86) PCT No.: PCT/JP2011/061627
§ 371 (c)(1),
(2), (4) Date: Nov. 18, 2013

(87) PCT Pub. No.: WO2012/160619
PCT Pub. Date: Nov. 29, 2012

(65) Prior Publication Data
US 2014/0105705 A1 Apr. 17, 2014

(51) Int. Cl.
*F16B 35/04* (2006.01)
*F16B 25/00* (2006.01)

(52) U.S. Cl.
CPC ............. *F16B 25/00* (2013.01); *F16B 25/0047* (2013.01); *F16B 25/0052* (2013.01)
USPC .......................................... 411/420; 411/411

(58) Field of Classification Search
USPC .......... 411/411, 417, 418, 420, 423, 424, 938
See application file for complete search history.

(56) References Cited

U.S. PATENT DOCUMENTS

| | | | | |
|---|---|---|---|---|
| 422,307 | A * | 2/1890 | Libbey | 411/412 |
| 3,405,596 | A * | 10/1968 | Neuschotz | 411/418 |
| 5,110,245 | A * | 5/1992 | Hiroyuki | 411/421 |
| 5,141,376 | A * | 8/1992 | Williams et al. | 411/387.4 |
| 5,273,383 | A * | 12/1993 | Hughes | 411/311 |
| 5,340,254 | A * | 8/1994 | Hertel et al. | 411/311 |
| 6,860,690 | B2 * | 3/2005 | Watanabe | 411/411 |
| 6,976,818 | B2 | 12/2005 | Levey et al. | |
| 7,762,752 | B2 * | 7/2010 | Kato | 411/386 |
| 2003/0156921 | A1 * | 8/2003 | Nagawa et al. | 411/411 |
| 2004/0184897 | A1 * | 9/2004 | Levey et al. | 411/411 |
| 2007/0297873 | A1 * | 12/2007 | Wieser et al. | 411/411 |
| 2008/0050200 | A1 * | 2/2008 | Su | 411/411 |
| 2009/0169334 | A1 | 7/2009 | Su | |

FOREIGN PATENT DOCUMENTS

EP 1635077 A1 3/2006
JP 10-103321 A 4/1998

(Continued)

*Primary Examiner* — Roberta Delisle
(74) *Attorney, Agent, or Firm* — Konomi Takeshita

(57) ABSTRACT

Disclosed herein is a tapping screw (1) exerting an excellent anti-loosening effect with regard to a workpiece made of a soft material such as resin and an aluminum alloy. The tapping screw (1) includes a shaft part (3), and a normal thread (10) which is formed on the outer circumferential surface of the shaft part. A clearance groove (20) is formed by cutting out a portion of a ridge of the normal thread, and an engaging protrusion (30) is provided on a bottom of the clearance groove along a portion or an entirety of an edge of the bottom that continuously extends from a flank surface of the normal thread. The tapping screw (1) exerts an excellent anti-loosening effect even when a workpiece expands, contracts or oscillates because the engaging protrusions (30) are embedded into portions of the workpiece which have been embedded into the clearance grooves (20).

3 Claims, 11 Drawing Sheets

(56) References Cited

FOREIGN PATENT DOCUMENTS

| JP | 3290362 B2 | 3/2002 |
|----|------------|--------|
| JP | 2002-106539 A | 4/2002 |
| JP | 2002-523691 A | 7/2002 |
| JP | 2006-57801 A | 3/2006 |
| JP | 2010-133528 A | 6/2010 |
| WO | 2010-092817 A1 | 8/2010 |

* cited by examiner

TAPPING SCREW

FIELD OF THE INVENTION

The present invention relates to a tapping screw which is threaded into a non-threaded hole, formed in a workpiece, while forming an internal thread in the hole.

BACKGROUND OF THE INVENTION

Generally, tapping screws are threaded into workpieces made of soft materials such as resin, aluminum alloys, etc. A representative example of such tapping screws was proposed in Japanese Patent No. 3290362. In this tapping screw, an external thread is spirally formed on an outer circumferential surface of a shaft part. By virtue of the external thread, the tapping screw forms an internal thread in a hole formed in a workpiece while the tapping screw is threaded into the hole. Furthermore, portions of a ridge of the external thread are cut out in the same direction as that of an axis of the tapping screw so as to form clearance grooves. Portions of the workpiece that are compressed by the external thread when the internal thread is formed, are embedded into the clearance grooves, thus exerting an anti-loosening effect.

PRIOR ART DOCUMENT

Patent Document 1: Japanese Patent No. 3290362

SUMMARY OF THE INVENTION

However, the conventional tapping screw cannot satisfactorily exert an anti-loosening effect, so that it is difficult to reliably prevent the tapping screw from being undesirably loosened.

In order to overcome the above problem, the present invention provides a tapping screw, including: a shaft part; and a normal thread formed on an outer circumferential surface of the shaft part, wherein a clearance groove is formed by cutting out a portion of a ridge of the normal thread, and an engaging protrusion is provided on a bottom of the clearance groove along a portion or an entirety of an edge of the bottom that continuously extends from a flank surface of the normal thread.

The tapping screw can exert not only an anti-loosening effect resulting from a portion of the workpiece being embedded into the clearance groove but also an anti-loosening effect resulting from the engaging protrusion being embedded into the portion of the workpiece that has been embedded into the clearance groove.

The normal thread may have an asymmetric shape, and the engaging protrusion may be provided on an edge of the bottom of the clearance groove that continuously extends from a flank surface having a smaller flank angle.

In the tapping screw having the above-mentioned structure, a portion of workpiece, which is compressed by the external thread when an internal thread is formed in the hole of the workpiece, is embedded into each clearance groove. Here, a larger amount of workpiece portion is embedded the side that has the smaller flank angle. Therefore, in the case where the engaging protrusion is provided on an edge of the bottom of the clearance groove that continuously extends from the flank surface having a smaller flank angle, the anti-loosening effect can be further enhanced.

The shaft part may have a cross-sectional shape formed in such a way that a plurality of arc-shaped parts having different curvature radii are connected to each other.

In this case, portions of the workpiece that are compressed by the external thread while the internal thread is formed in the hole are embedded into the circumferential surface of the shaft part, thus further enhancing the anti-loosening effect.

A tapping screw according to the present invention exerts an excellent anti-loosening effect even when a workpiece expands, contracts or oscillates.

Other features and advantages of the present invention will become apparent from the following detailed description, taken in conjunction with the accompanying drawings which illustrate, by way of example, the principles of the invention.

DETAILED DESCRIPTION OF THE INVENTION

Figure 1:
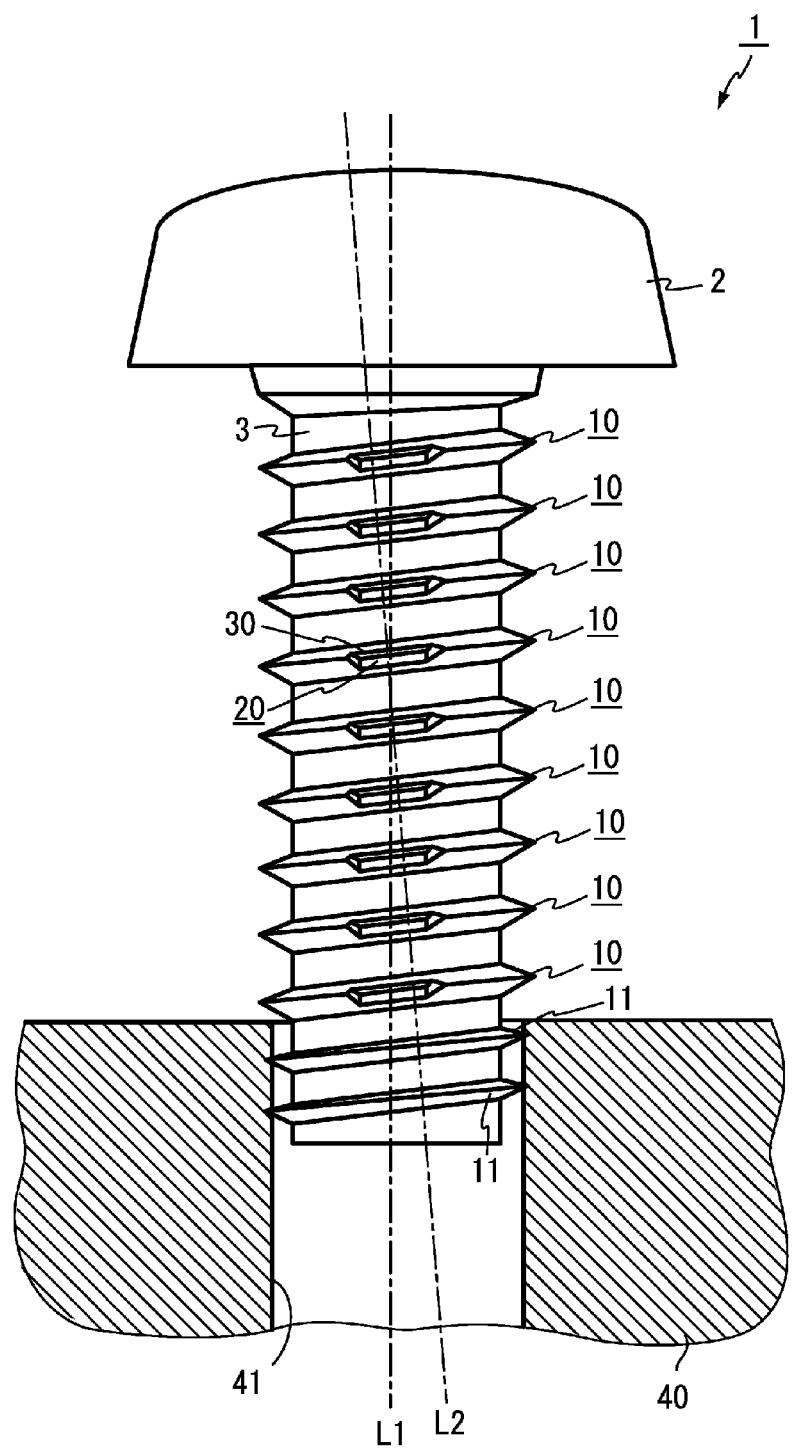
FIG. 1 is a front view showing a first embodiment of the present invention.

Hereinafter, a first embodiment of the present invention will be described in detail with reference to FIGS. 1 through 4. Referring to FIG. 1, reference numeral 1 denotes a tapping screw including a head part 2 and a shaft part 3 which is integrally provided with the head part 2. For example, the tapping screw 1 is made of carbon steel. The head part 2 has in the surface thereof a drive hole (not shown) through which screw driving force is transmitted to the tapping screw 1 from a driver bit (not shown). A normal thread 10 is formed on an outer circumferential surface of the shaft part 3 that is integrally provided with the head part 2.

Having a smaller diameter than that of the normal thread 10, a guide thread 11 is provided on the outer circumferential surface of a front end of the shaft part 3 and continuously extended from the normal thread 10. The guide thread 11 has a diameter that is equal to or is slightly greater than the diameter of a hole 41 formed in a workpiece 40. As such, the tapping screw 1 is configured such that after the front end of the shaft part 3 is inserted into the hole 41, the tapping screw 1 is threaded into the workpiece 40 while the guide thread 11 and the normal thread 10 form an internal thread in the hole 41 of the workpiece 40. The workpiece 40 is made of a soft material such as a resin or an aluminum alloy.

Figure 3:
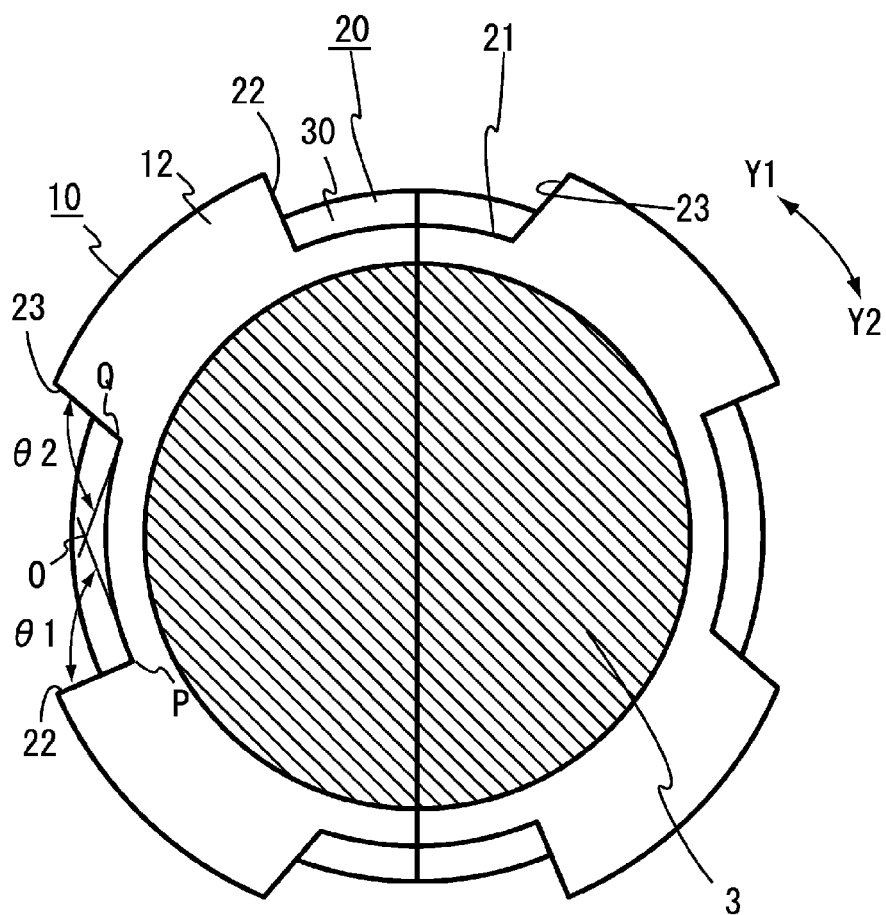
FIG. 3 is a sectional view taken along line A-A of FIG. 2.

As shown in FIG. 1, the normal thread 10 has therein a plurality of clearance grooves 20 which are formed by cutting out portions of the ridge of the normal thread 10. The clearance grooves 20 are arranged along a line L1 extending in the same direction as that of the axis of the tapping screw 1. As shown in FIG. 3, the clearance grooves 20 are arranged at positions spaced apart from each other at regular intervals with reference to a circumferential direction of the normal thread 10. The depth of each clearance groove 20 is set to about ⅔ of the height of the normal thread 10. Portions of the workpiece 40 that are compressed by the external thread when the internal thread is formed in the workpiece 40 are embedded into the clearance grooves 20, thus exerting an anti-loosening effect.

As shown in FIG. 1, the clearance groove 20 may be arranged along a line L2 extending in a direction perpendicular to a tangential line of the spiral of the normal thread 10. Thereby, the pull-out resistance of the tapping screw 1 is enhanced so that the tapping screw 1 that has been threaded into the workpiece 40 can be reliably prevented from being undesirably removed therefrom.

Figure 4:
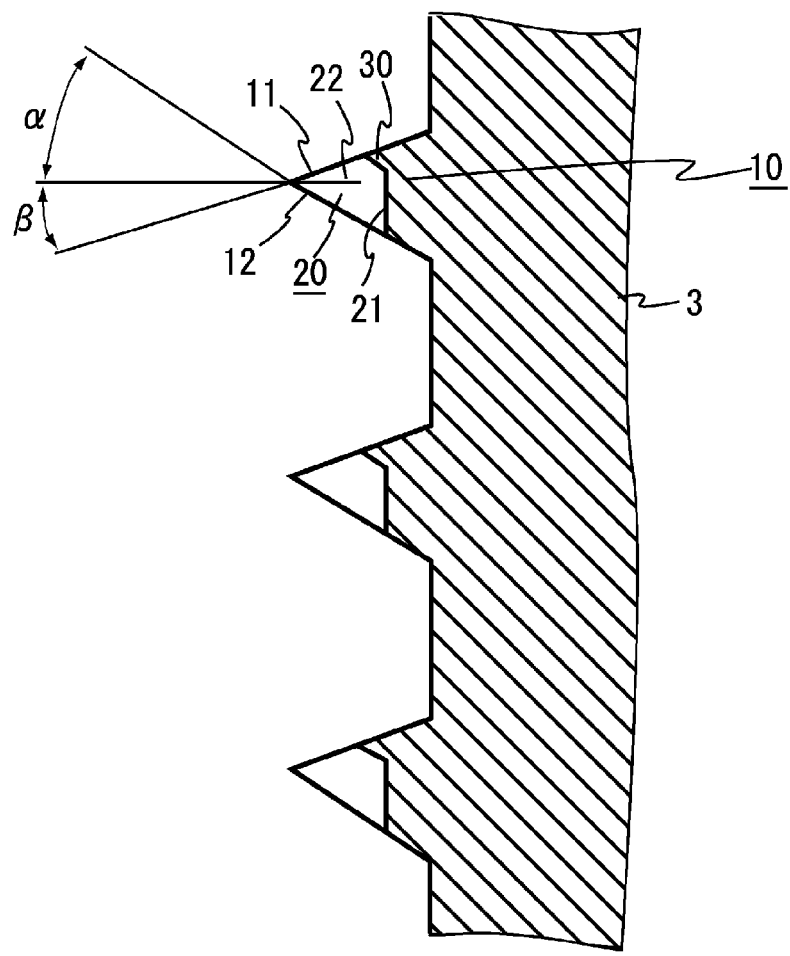
FIG. 4 is an enlarged longitudinal sectional view of a critical portion of the first embodiment of the present invention.

As shown in FIG. 4, the normal thread 10 is configured to have a asymmetric shape in such a way that a leading flank angle α is greater than a pressure flank angle β so as to prevent the tapping screw 1 from being loosening.

Figure 2:
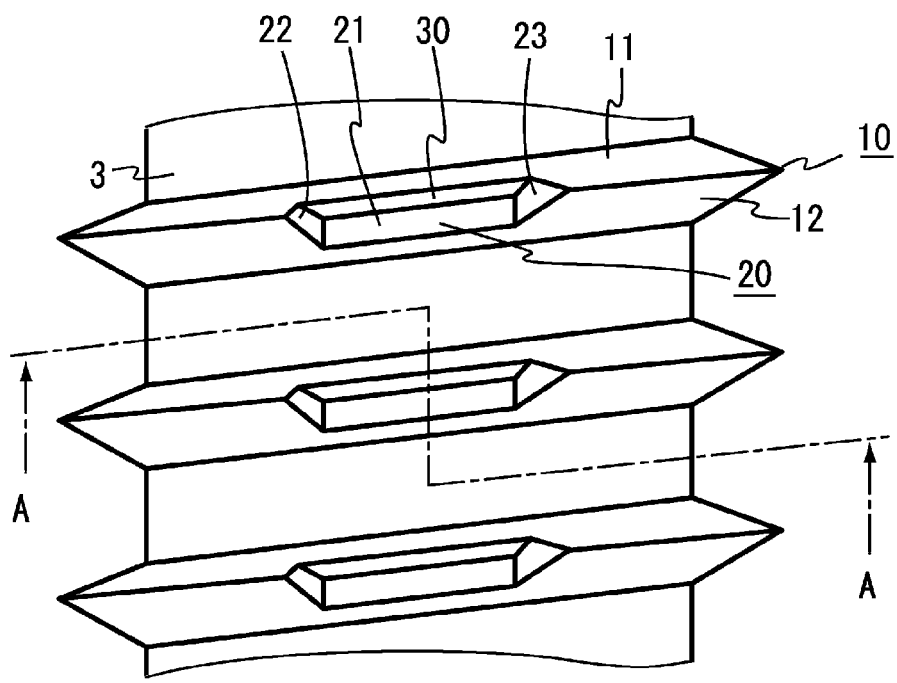
FIG. 2 is an enlarged front view showing a critical portion of the first embodiment of the present invention.

As shown in FIGS. 2 and 4, an engaging protrusion 30 is provided on an edge of a bottom 21 of the clearance groove 20 that extends from a pressure flank surface 11 of the normal thread 10. The engaging protrusion 30 protrudes from the bottom 21 of the clearance groove 20 and has a reverse V-shaped cross-section. The height of the engaging protrusion is set to the maximum about ⅕ of the depth of the clearance groove 20. Portions of the workpiece 40 which are compressed by the external thread when the internal thread is formed in the workpiece 40 are deeply embedded into the clearance grooves 20 to the bottom 21 by springback. Here, the engaging protrusions 30 are embedded into the portions of the workpiece 40, thus further enhancing the anti-loosening effect.

Of sides at which the pressure flank surface 11 and the leading flank surface 12 are disposed, the amount of workpiece portion that is embedded into the clearance groove 20 towards a side having a smaller flank angle α or β is larger than that of a side having a larger flank angle α or β. Therefore, a location at which the engaging protrusion 30 is disposed is determined depending on setting of the leading flank angle α and the pressure flank angle β. In the case of the tapping screw 1 of the first embodiment in which the pressure flank angle β is less than the leading flank angle α (β<α), the engaging protrusion 30 is provided along the edge of the bottom 21 that continuously extends from the pressure flank surface 11. When thread coupling is completed, the pressure flank surface 11 forcibly pressurizes the internal threaded portion. Thereby, springback is caused in the internal threaded portion, so that the engaging protrusions 30 are embedded into the internal threaded portion. As a result, the anti-loosening effect can be markedly enhanced.

Figure 5:
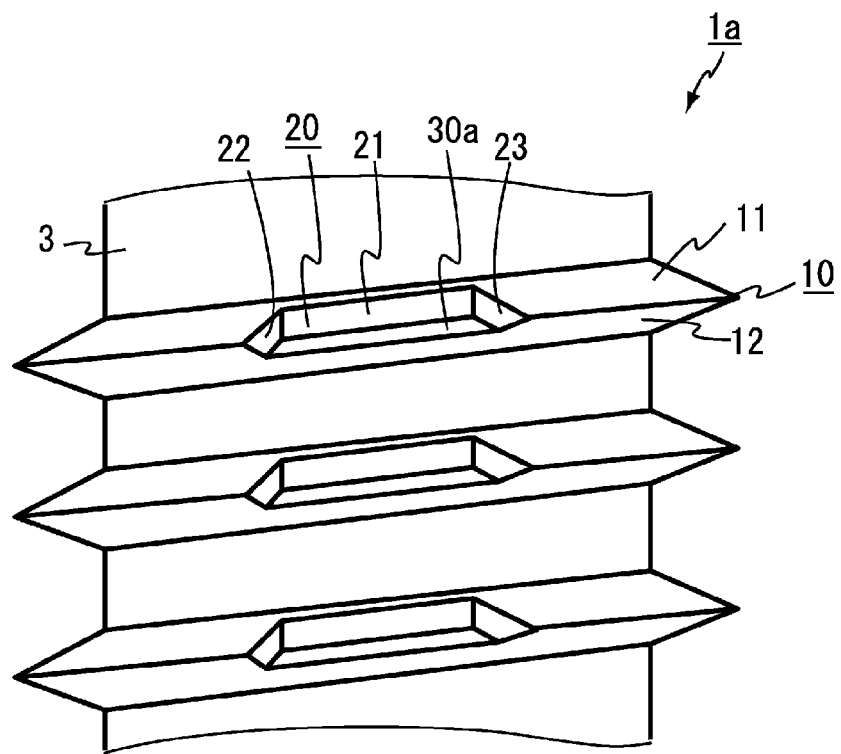
FIG. 5 is an enlarged front view showing a critical portion of a second embodiment of the present invention.
Figure 6:
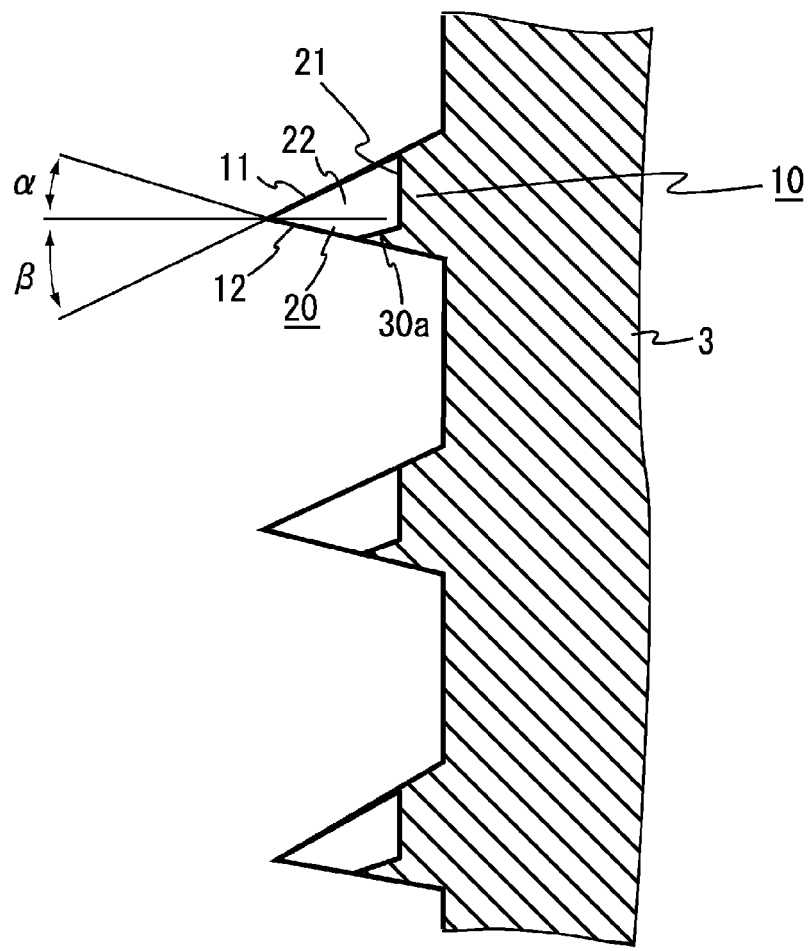
FIG. 6 is an enlarged longitudinal sectional view of a critical portion of the second embodiment of the present invention.

FIGS. 5 and 6 illustrate a tapping screw 1a of the second embodiment.

The tapping screw 1a is set such that the pressure flank angle β is larger than the leading flank angle α (β>α). Therefore, an engaging protrusion 30a is provided on an edge of the bottom 21 that continuously extends from the leading flank surface 12.

Figure 7:
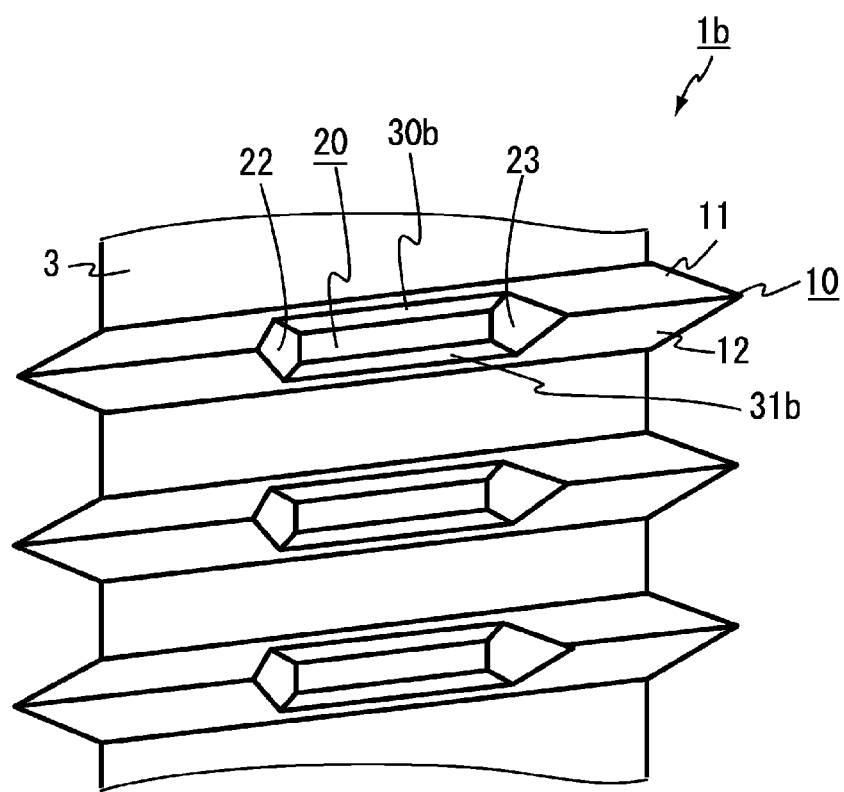
FIG. 7 is an enlarged front view showing a critical portion of a third embodiment of the present invention.
Figure 8:
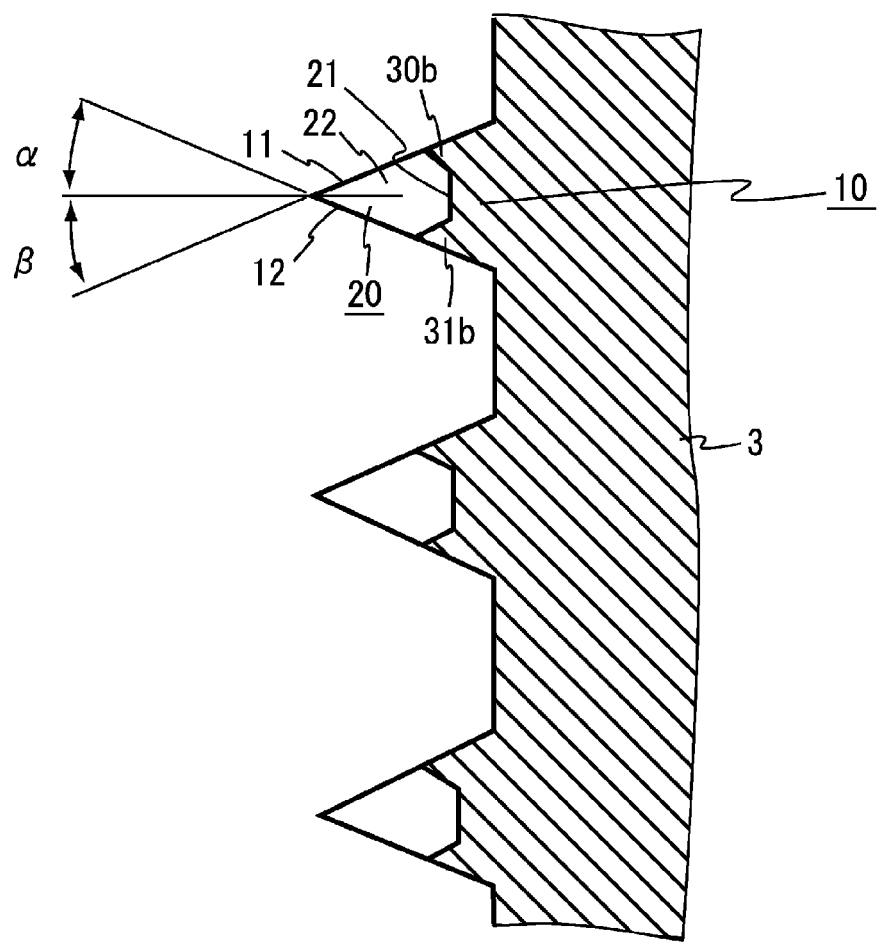
FIG. 8 is an enlarged longitudinal sectional view of a critical portion of the third embodiment of the present invention.

FIGS. 7 and 8 illustrate a tapping screw 1b of the third embodiment. The tapping screw 1b is set such that the pressure flank angle β is the same as the leading flank angle α (β=α). Therefore, engaging protrusions 30b and 31b are respectively provided on opposite edges of the bottom 21 that extend from the pressure flank surface 11 and the leading flank surface 12.

Figure 9:
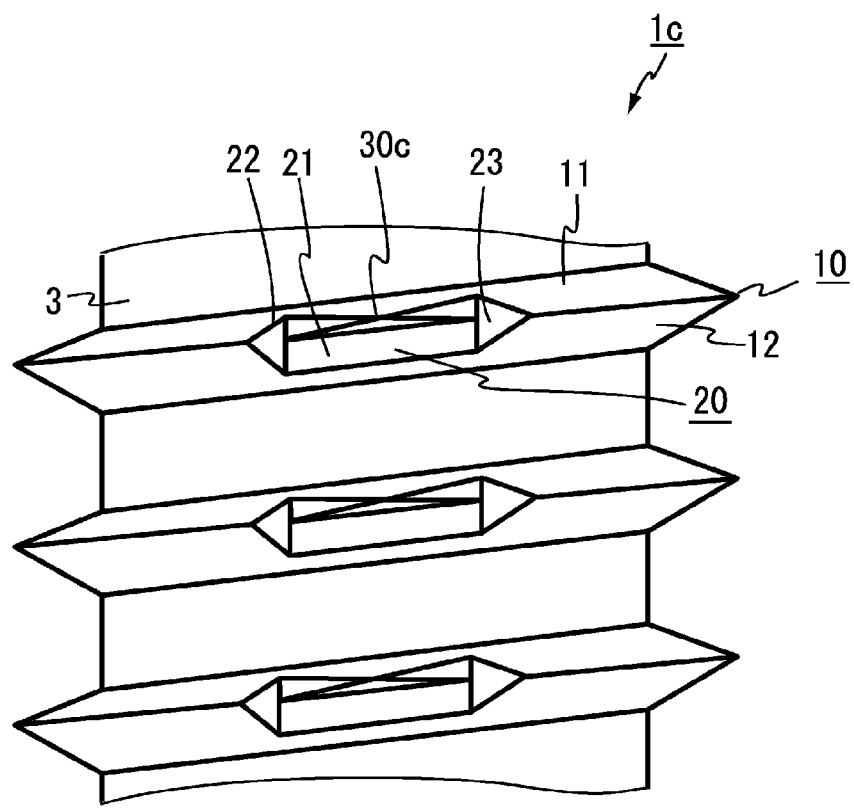
FIG. 9 is an enlarged front view showing a critical portion of a fourth embodiment of the present invention.
Figure 10:
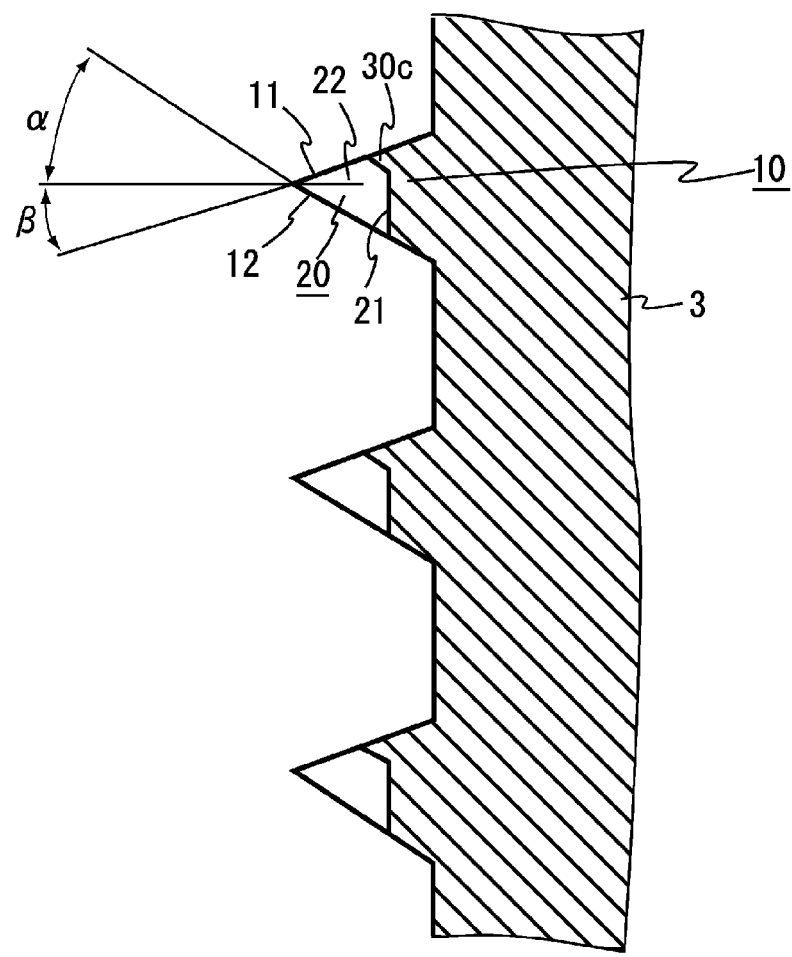
FIG. 10 is an enlarged longitudinal sectional view of a critical portion of the fourth embodiment of the present invention.

FIGS. 9 and 10 illustrate a tapping screw 1c of the fourth embodiment. An engaging protrusion 30c is formed by protruding a portion of an edge of the bottom 21 that continuously extends from the pressure flank surface 11. In this case, the engaging protrusion 30c can also be embedded into the portions of the workpiece 40 that have been embedded into the clearance groove 20, thus exerting the anti-loosening effect.

Meanwhile, as shown in FIG. 3, the bottom 21 of the clearance groove 20 is a curved surface. A leading side wall 22 and a trailing side wall 23 are respectively provided on opposite ends of the bottom 21, thus forming the clearance groove 20, wherein the leading side wall 22 is disposed at a leading side with respect to the direction in which the tapping screw 1 is tightened, and the trailing side wall 23 is disposed at a trailing side. In FIG. 3, a junction point between the leading side wall 22 and the bottom 21 is designated by reference character P, and a junction point between the trailing side wall 23 and the bottom 21 is designated by reference character Q. A point at which tangential lines on the bottom 21 at the junction points P and Q intersect with each other denotes an intersection point O.

Here, the leading side wall 22 is set such that an angle θ1 between it and the line OP is 90° or an acute angle although it is not shown in the drawing. On the other hand, the trailing side wall 23 is set such that an angle θ2 between it and the line OQ is an obtuse angle. Therefore, when the tapping screw 1 is rotated in the direction (designated by the arrow Y2) in which it is loosened, the leading side wall 22 is stopped by a portion of the workpiece 40 that has been embedded into the clearance groove 20. Thereby, the anti-loosening effect can be exerted. Meanwhile, when the tapping screw 1 is rotated in the direction (designated by the arrow Y1) in which it is tightened while forming an internal thread, the trailing side wall 23 is not stopped by the portion of the workpiece 40, whereby the tapping screw 1 can be smoothly threaded into the workpiece 40.

Figure 11:
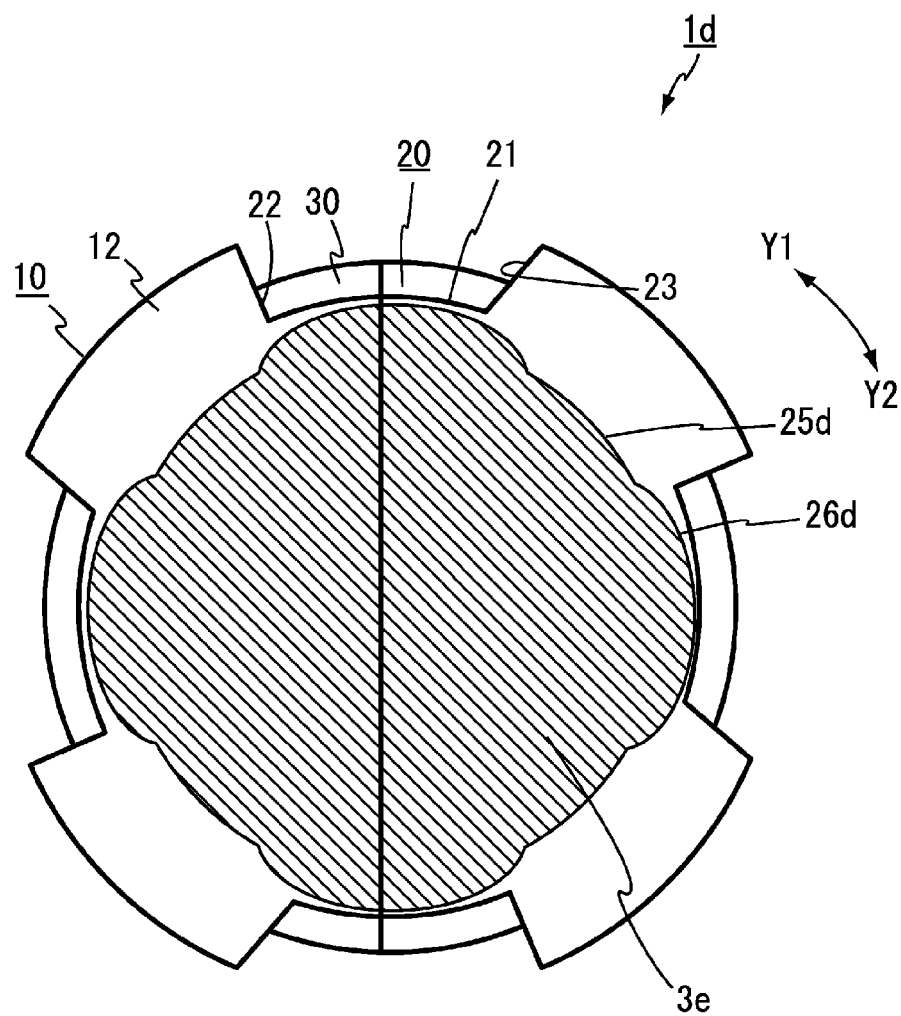
FIG. 11 is an enlarged cross-sectional view showing a critical portion of a fifth embodiment of the present invention.

FIG. 11 illustrates a tapping screw 1d according to a fifth embodiment of the present invention. The cross-sectional shape of the shaft part 3e is formed in such a way that arc-shaped parts 25d and 26d having different curvature radii are alternately connected to each other. Thus, portions of the workpiece 40, which are compressed by the external thread when the internal thread is formed, are embedded into connection portions of the arc-shaped parts 25d and 26d, whereby the anti-loosening effect can be further enhanced.

It is to be understood that the above-described embodiments are illustrative of only some of the many possible specific embodiments which can represent applications of the principles of the invention. Numerous and varied other arrangements can be readily devised by those skilled in the art without departing from the spirit and scope of the invention.

DESCRIPTION OF THE REFERENCE
NUMERALS IN THE DRAWINGS 1, 1a, 1b, 1c, 1d tapping screw
2 head part
3, 3e shaft part
9 guide thread
10 normal thread
11 pressure flank surface
12 leading flank surface
20 clearance groove

21 bottom
22 leading side wall
23 trailing side wall
25*d*, 26*d* arc-shaped part
30, 30*a*, 30*b*, 31*b*, 30*c* engaging protrusion
40 workpiece
41 hole

What is claimed is:

1. A tapping screw, comprising: a shaft part; and a normal thread formed on an outer circumferential surface of the shaft part,
   wherein a clearance groove is formed by cutting out a portion of a ridge of the normal thread, and an engaging protrusion is provided on a bottom of the clearance groove along a portion or an entirety of an edge of the bottom that continuously extends from a flank surface of the normal thread and said engaging protrusion protrudes from the bottom of the clearance groove.

2. The tapping screw of claim 1, wherein the normal thread has an asymmetric shape, and the engaging protrusion is provided on an edge of the bottom of the clearance groove that continuously extends from a flank surface having a smaller flank angle.

3. The tapping screw of claim 1 or 2, wherein the shaft part has a cross-sectional shape formed in such a way that a plurality of arc-shaped parts having different curvature radii are connected to each other.

\* \* \* \* \*